(12) United States Patent
Watanabe et al.

(10) Patent No.: US 8,342,066 B2
(45) Date of Patent: Jan. 1, 2013

(54) CUTTING TOOL FOR MACHINING INNER SURFACE OF HOLE, AND METHOD FOR CUTTING THE SAME

(75) Inventors: Shoichiro Watanabe, Shimotsuma (JP); Hidehiko Nagaya, Joso (JP); Norio Aso, Sashima-gun (JP); Yasuharu Imai, Shimotsuma (JP)

(73) Assignee: Mitsubishi Materials Corporation, Tokyo (JP)

( * ) Notice: Subject to any disclaimer, the term of this patent is extended or adjusted under 35 U.S.C. 154(b) by 539 days.

(21) Appl. No.: 12/585,137

(22) Filed: Sep. 4, 2009

(65) Prior Publication Data
US 2010/0178116 A1    Jul. 15, 2010

(30) Foreign Application Priority Data

Oct. 29, 2008 (JP) ................................. 2008-278308

(51) Int. Cl.
*B23B 27/10* (2006.01)
*B23B 27/16* (2006.01)

(52) U.S. Cl. ............................................ 82/1.11; 82/50
(58) Field of Classification Search .................... 407/11; 408/56; 82/50, 1.11, 47; 409/135
See application file for complete search history.

(56) References Cited

U.S. PATENT DOCUMENTS

| | | | | |
|---|---|---|---|---|
| 3,543,613 A | * | 12/1970 | Obloy | 408/57 |
| 3,597,817 A | * | 8/1971 | Whalley | 407/11 |
| 4,072,438 A | * | 2/1978 | Powers | 408/59 |
| 4,979,853 A | * | 12/1990 | Field | 409/136 |
| 5,833,403 A | * | 11/1998 | Barazani | 407/101 |
| 6,186,706 B1 | * | 2/2001 | Nesse et al. | 408/1 R |
| 7,104,171 B1 | * | 9/2006 | Long | 82/158 |
| 2008/0083307 A1 | * | 4/2008 | Giannetti | 82/157 |
| 2010/0178117 A1 | * | 7/2010 | Watanabe et al. | 407/11 |

FOREIGN PATENT DOCUMENTS

| | | |
|---|---|---|
| EP | 0767023 A1 | 4/1997 |
| EP | 1806191 A2 | 7/2007 |
| JP | 07-237006 A | 9/1995 |
| JP | 2007-185765 A | 7/2007 |
| JP | 2007-268695 A | 10/2007 |
| WO | WO-2004/002662 A1 | 1/2004 |

OTHER PUBLICATIONS

International Search Report dated Dec. 28, 2009, issued on the related PCT application, PCT/JP2009/005764.
Supplementary European Search Report dated Feb. 24, 2012, issued for the corresponding European patent application No. 09823340.6.

* cited by examiner

*Primary Examiner* — Will Fridie, Jr.
(74) *Attorney, Agent, or Firm* — Edwards Wildman Palmer LLP

(57) ABSTRACT

The cutting tool for machining an inner surface of a hole is provided with a cutting tool main body extending in the shape of a shaft, a cutting edge portion mounted on a head portion of the cutting tool main body so as to radially-outwardly protrude with respect to the center axis of the cutting tool main body, and a coolant hole formed at the cutting tool main body so as to have an opening at a position apart from the cutting edge portion on a circumferential surface of the head portion of the cutting tool main body, thereby flushing out a coolant from the opening to an axially orthogonal plane orthogonal to the center axis and also along a protruding direction at which the cutting edge portion protrudes. The opening of the coolant hole faces a direction different from the protruding direction of the cutting edge portion in the radial direction with respect to the center axis.

9 Claims, 13 Drawing Sheets

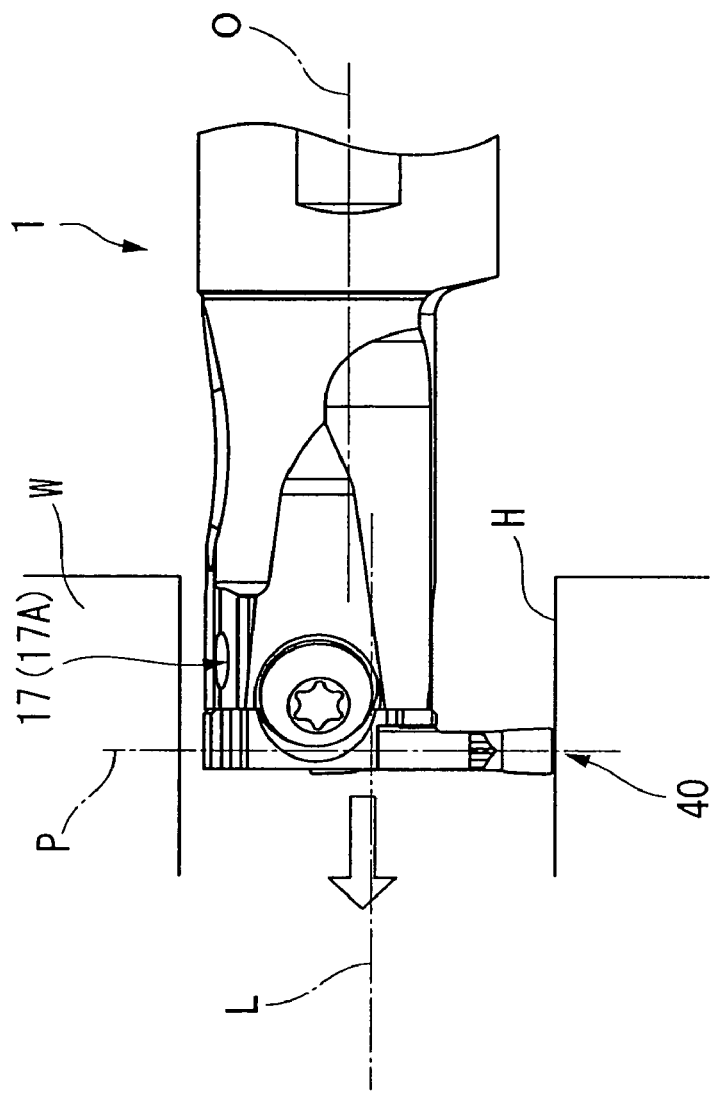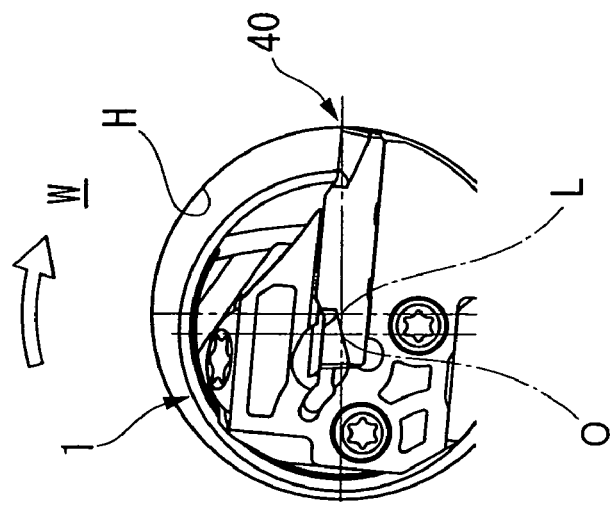
FIG. 7B
FIG. 7A

CUTTING TOOL FOR MACHINING INNER SURFACE OF HOLE, AND METHOD FOR CUTTING THE SAME

CROSS-REFERENCE TO RELATED APPLICATIONS

Priority is claimed on Japanese Patent Application No. 2008-278308 filed Oct. 29, 2008, the content of which is incorporated herein by reference.

BACKGROUND OF THE INVENTION

1. Field of the Invention

The present invention is related to a cutting tool for machining an inner surface of a hole which cuts an inner circumferential surface of a hole formed on a workpiece which rotates and a method for cutting the inner surface of the hole.

2. Description of the Related Art

For example, Japanese Published Unexamined Patent Application No. H07-237006 has described, as a tool for groove-forming an inner circumferential surface of a hole, a tool such that a groove-forming insert is detachably attached to a support portion radially-outwardly protruding with respect to the center axis of a cutting tool main body to have a cutting edge portion. In the above-described cutting tool, a groove is formed on a mounting surface of the support portion on which a seating surface of the groove-forming insert is mounted. In cutting an inner circumferential surface of a hole, a coolant (cutting fluid) is supplied to the inner circumferential surface of the hole via a flushing hole formed between the groove and the seating surface, thereby cooling and lubricating a cutting edge of the insert and a cut site of an annular groove formed by the cutting edge.

However, in the above-described cutting tool and a method for cutting an inner surface of a hole using the cutting tool, a coolant is supplied directly below a flank continuing to the cutting edge of the cutting edge portion into the annular groove. Therefore, the coolant is supplied to the cut site after making approximately one round from the cutting edge in association with the rotation of a workpiece. As a result, there are fears that the coolant is scattered while making one round resulting in a failure of sufficient supply to the cut site and that the coolant is heated resulting in a deterioration of the effect of cooling the cutting edge.

Further, in the above-described cutting tool, as described above, the groove is formed on the mounting surface on which the seating surface of the groove-forming insert is mounted, thereby flushing out a coolant from a flushing hole formed between the groove and the seating surface. Therefore, it is impossible to make the flushing hole (width of the groove) larger in dimension than the mounting surface or the seating surface. As a result, it is difficult to supply the coolant in a sufficient quantity. Further, the groove is formed on the mounting surface, by which the seating surface of the insert is smaller in area. Still further, there are fears that a coolant with a lubricating property may ooze between the mounting surface and the seating surface of the insert.

The present invention has been made under these circumstances, an object of which is to provide a cutting tool for machining an inner surface of a hole which is not deteriorated in the seating stability of an insert even in a detachable insert-type tool and capable of reliably supplying a sufficient quantity of a coolant to a cut site to improve the cooling and lubricating effects thereof and also to provide a method for cutting an inner surface of a hole.

SUMMARY OF THE INVENTION

The cutting tool for machining an inner surface of a hole in the present invention is provided with a cutting tool main body extending in the shape of a shaft, a cutting edge portion which is provided on at a head portion of the cutting tool main body so as to radially-outwardly protrude with respect to the center axis of the cutting tool main body and a coolant hole which is formed at the cutting tool main body so as to have an opening at a position apart from the cutting edge portion on a circumferential surface of the head portion of the cutting tool main body, thereby flushing out a coolant from the opening to an axially orthogonal plane orthogonal to the center axis and also along a protruding direction at which the cutting edge portion protrudes. The opening of the coolant hole faces a direction different from the protruding direction of the cutting edge portion in a radial direction with respect to the center axis.

The method for cutting an inner surface of a hole in the present invention is provided with a step in which a cutting tool for machining an inner surface of a hole which has a cutting edge portion radially-outwardly protruding with respect to the center axis of the cutting tool main body at the head portion of the cutting tool main body extending in the shape of a shaft is inserted into a hole formed at the center of the rotating axis of a workpiece which rotates around the rotating axis, a step in which the cutting edge portion is allowed to cut into the hole in the protruding direction of the cutting edge portion, thereby cutting the inner circumferential surface of the hole, and a step in which a coolant is flushed out from a coolant hole formed at a position apart from the cutting edge portion in a circumferential direction of the cutting tool main body on the cutting tool main body in a direction different from the protruding direction of the cutting edge portion and in the radial direction with respect to the center axis in relation to the axially orthogonal plane orthogonal to the center axis and along the protruding direction of the cutting edge portion, thereby supplying the coolant to the inner circumferential surface of the hole.

As described above, when the inner circumferential surface of the hole formed on the workpiece which rotates is machined by the cutting edge portion, an annular groove recessed from the inner circumferential surface is formed on an inner circumferential surface of the hole so as to run along a part intersecting with the axially orthogonal plane which is orthogonal to the center axis of the cutting tool main body and also along the protruding direction of the cutting edge portion. Thus, in the cutting tool for machining an inner surface of a hole and the method for cutting the same in the present invention, a coolant is flushed out toward the axially orthogonal plane to retain the coolant inside the groove by the centrifugal force acting on a workpiece. An opening of the coolant hole on the cutting tool is formed at a position apart from the cutting edge portion in the circumferential direction of the cutting tool main body, facing a direction different from the protruding direction of the cutting edge portion in the radial direction with respect to the center axis. In other words, when the head portion of the cutting tool main body is viewed from the direction of the center axis, the opening of the coolant hole faces a direction different from the cutting edge portion. Therefore, upon flushing out of a coolant from the opening, the coolant is reliably supplied to a cut site by the rotation of the workpiece.

According to the present invention, the coolant hole is formed at a position apart from a position at which the cutting edge portion protrudes in a direction different from the protruding direction of the cutting edge portion. Therefore, even when the cutting edge portion is constituted by detachably attaching a groove-forming insert to the cutting tool main body, there is no chance that the coolant hole is restricted dimensionally by a seating surface of the groove-forming insert or a mounting surface on which the seating surface is mounted. Thereby it is possible to flush out and supply the coolant in a sufficient quantity. Further, there is no chance that the cutting edge portion is deteriorated in strength due to formation of the coolant hole or that the groove-forming insert is deteriorated in seating stability due to mounting thereof.

In the cutting tool for machining an inner surface of a hole in the present invention, the opening of the coolant hole may be provided on the opposite side of the cutting edge portion in the circumferential direction of the cutting tool main body behind an axially parallel plane orthogonal to the protruding direction of the cutting edge portion along the center axis. In other words, when the head portion of the cutting tool main body is viewed from the direction of the center axis, the circumferential surface of the head portion of the cutting tool main body is divided into a region in which the cutting edge portion is arranged in the center and a remaining region which does not include the cutting edge portion, and in this instance, the opening of the coolant hole may be provided in the remaining region.

When the cutting tool of the present invention is inserted into a hole formed in advance in a workpiece and cut in the protruding direction of the cutting edge portion, a clearance according to a cut amount is made between the cutting tool main body and the inner circumferential surface of the hole on the opposite side of the cutting edge portion behind the axially parallel plane orthogonal to the protruding direction. In other words, a clearance between the remaining semi-cylindrical region and the inner circumferential surface of the hole is widened so that a coolant can be flushed out reliably through the clearance toward the groove formed on the inner circumferential surface of the hole to be machined and thereby be retained on the groove.

In the cutting tool for machining an inner surface of a hole in the present invention, the opening of the coolant hole may be formed opposite to the protruding direction of the cutting edge portion in the radial direction with respect to the center axis in relation to the axially parallel plane orthogonal to the protruding direction of cutting edge portion along the center axis. In other words, when the head portion of the cutting tool main body is viewed from the direction of the center axis, the opening of the coolant hole may face a direction opposite to the leading end of the cutting edge portion.

Where the coolant hole is opened opposite to the protruding direction of the cutting edge portion, a distance at which a coolant is supplied to the inner circumferential surface of the hole to arrive at a cut site formed by the cutting edge portion due to the rotation of a workpiece can be kept to at most approximately ¾ of a circumference of the hole in the rotational direction of the workpiece. Thereby, it is possible to suppress the scattering and heating of the coolant.

In the cutting tool for machining an inner surface of a hole in the present invention, the opening of the coolant hole may be formed so as to flush out the coolant in an oblique direction in relation to the axially orthogonal plane. Thereby, the cutting edge portion in the direction of the center axis of the cutting tool main body can be positioned at a position different from the opening of the coolant hole, thus making it possible to prevent the cutting tool main body from deteriorating in rigidity.

In the cutting tool for machining an inner surface of a hole in the present invention, the cutting edge portion may be a groove-forming cutting edge portion for forming an annular groove at the center of the rotating axis on the inner circumferential surface of a hole formed on a workpiece. Thereby, it is possible to retain reliably a coolant flushed out toward the inner circumferential surface by the annular groove and to sufficiently supply the coolant to a cut site.

According to the present invention, the cutting edge portion is not deteriorated in strength or stability on attachment of the insert and a coolant can be reliably supplied in a sufficient quantity to the cut site, thereby improving the cooling and lubricating effects thereof. Therefore, it is possible to reduce the cutting resistance, extend the life of the cutting edge portion and provide stable and smooth machining.

BRIEF DESCRIPTION OF THE DRAWINGS

FIG. 7A is a view used to explain one embodiment of the cutting method of the present invention where the inner surface of a hole is cut according to the embodiment shown in FIG. 1. FIG. 7A is a view of a leading end of a cutting tool main body 1 in the direction of the center axis O. FIG. 7B is a side plan view of the cutting tool main body 1.

FIG. 8A is a view of a leading end of a cutting tool main body 1 in the direction of the center axis O.

FIG. 9A is a view of a leading end of a cutting tool main body 1 in the direction of the center axis O.

DESCRIPTION OF THE PREFERRED EMBODIMENTS

Figure 1:
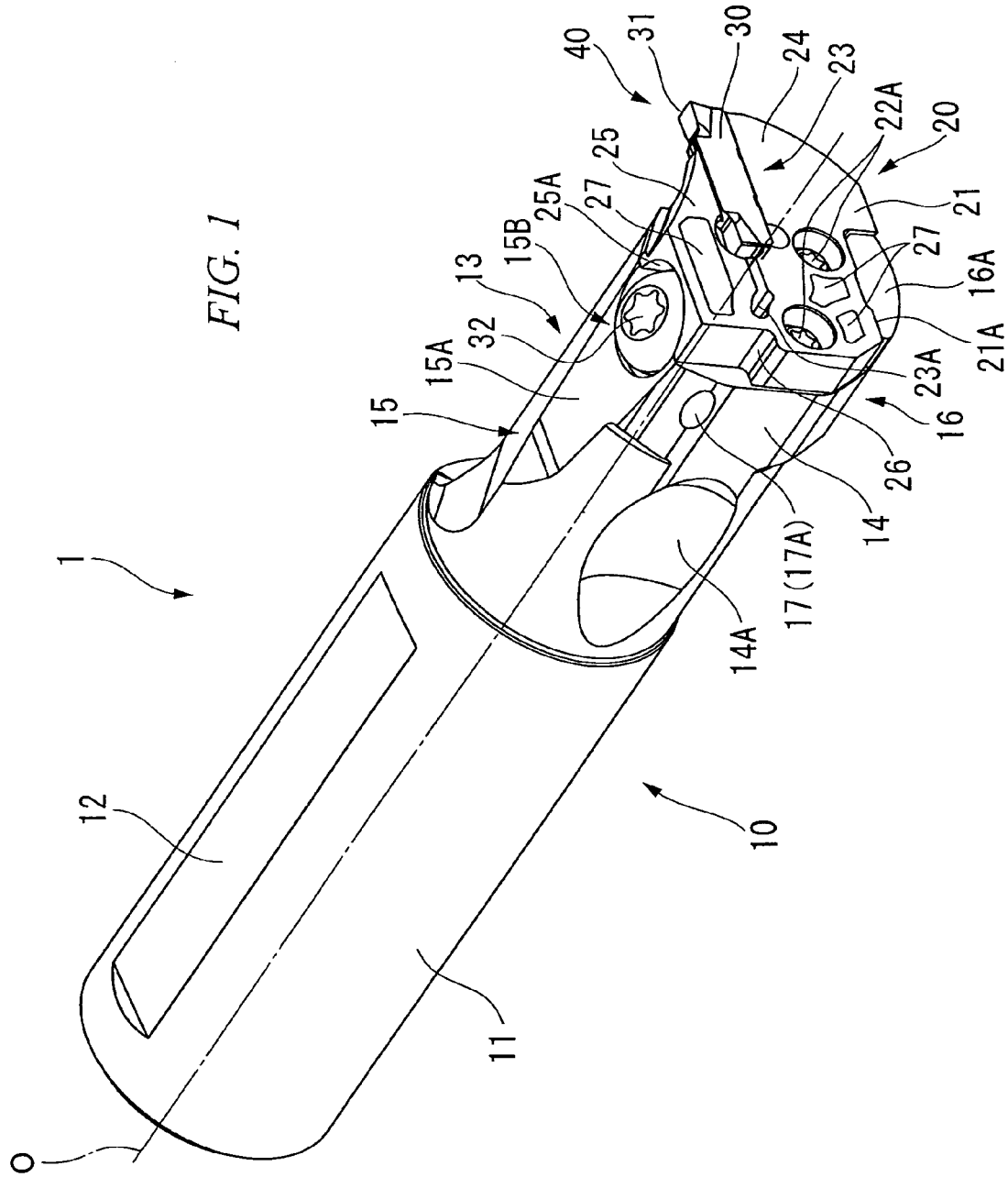
FIG. 1 is a perspective view showing a first embodiment of the cutting tool of the present invention.

FIG. 1 to FIG. 6 show a first embodiment of the cutting tool for machining an inner wall surface of a hole in the present invention. FIG. 7A to FIG. 9B show one embodiment of the cutting method of the present invention using the cutting tool of the first embodiment. A cutting tool main body 1 of the cutting tool of the present embodiment is provided with a holder 10 having an outer shape formed approximately in a cylindrical shape centering around the center axis O, and a head member 20 detachably attached to a head portion of the holder 10 (a left-side portion in FIG. 2 and FIG. 4 and a right-side portion in FIG. 3). A detachably-attachable cutting insert 30 is attached to the head member 20, thereby constituting a cutting edge portion 40 which protrudes in one radial direction (a downward direction in FIG. 2, a rightward direction in FIG. 5 and a leftward direction in FIG. 6) with respect to the center axis O.

The holder 10 is made with a steel member or the like, and the rear end portion thereof (a right-side portion in FIG. 2 and FIG. 4, and a left-side portion in FIG. 3) is given as a shank portion 11, with the cylindrical shape kept as it is. At the upper and lower portion thereof, there is formed a pair of flat cutout surfaces 12 which are parallel to the center axis O, parallel to each other and in the protruding direction. Then, the shank portion 11 is retained in a state where the rotation is stopped by these cutout surfaces 12, by which the holder 10 is fixed to a working machine.

Further, the side surface 13 facing the protruding direction of the cutting edge portion 40, of two directions perpendicular to the center axis O and parallel to the cutout surface 12 (a vertical direction in FIG. 2 and a lateral direction in FIG. 5 and FIG. 6), is formed at the head portion of the holder 10 so as to be an inwardly-cutout section from an outer circumference of the shank portion 11. The other side surface 14 facing opposite to the protruding direction of the cutting edge portion 40 behind the center axis O, excluding the side surface 13, and upper and lower surfaces 15, 16 are formed to be greater in diameter than the side surface 13 with respect to the center axis O and are formed to be slightly smaller in outer diameter than the shank portion 11.

On the upper surface 15 of the head portion of the holder 10, there is formed an inclination surface 15A gently-inclined so as to be slightly to the lower surface 16 as the inclination surface 15A as close to the leading end. At a portion where the inclination surface 15A intersects the leading end surface of the holder 10, a counterbored portion 15B which is inclined more steeply than the inclination surface 15A and which also has a bottom surface inclined to the lower surface 16 as the counterbored portion 15B as close to the leading end is formed so as to be opened on the leading end. A screw hole (not illustrated) is formed perpendicularly on the bottom surface of the counterbored portion 15B. Further, a closed-end hollow (dimple) 14A which is recessed in an oval sphere shape to extend to the direction of the center axis O is formed at the shank portion 11 of the other side surface 14.

Still further, the leading end surface of the holder 10 is given as a flat surface perpendicular to the center axis O except that a raised portion 16A is formed on the lower surface 16 thereof. At a corner where the leading end surface, the side surface 13 and the lower surface 16 meet, there is provided a recessed portion 16B extending to the cutout surface 12 in a perpendicular direction (a vertical direction in FIG. 4 to FIG. 6) so as to be recessed markedly from the side surface 13. It is noted that the side surface 13 is given as a flat surface extending in parallel to the center axis O and in a perpendicular direction with respect to the cutout surface 12 at the leading end where the recessed portion 16B is formed. Also, the rear area of the side surface 13 is formed in a cylindrical surface shape expanding slightly in the protruding direction so as to be larger in radius than the shank portion 11 at a part between the flat surface of the side surface 13 and the shank portion 11.

In addition, the head member 20 is made with a steel member or the like. An L-shaped recessed portion 21A, into which the raised portion 16A of the leading end surface of the holder 10 is fitted, is formed at a lower edge of a main body 21 giving an externally flat shape. A rectangular plate-like raised portion 21B fitted into the recessed portion 16B, is integrally formed on one of the side surfaces of the main body 21 so as to protrude perpendicularly. Then, the one of the side surfaces is made to closely contact the leading end surface of the holder 10 in such a manner that the raised portion 16A and the raised portion 21B are respectively fitted into the recessed portion 21A and the recessed portion 16B. Then, two spanner screws 22A inserted into the main body 21 in the direction of the center axis O from the leading end and two spanner screws 22B inserted into the rectangular plate-like raised portion 21B perpendicularly from the protruding direction are screwed into screw holes (not illustrated) formed at the head portion of the holder 10. Thereby, the head member 20 is fixed to the head portion of the holder 10, with the thickness direction of the main body 21 pointed at the direction of the center axis O.

A slit-shaped insert seat 23 extending from the periphery of the center axis O of the holder 10 in the protruding direction is formed on the main body 21 of the head member 20 thus attached to the holder 10 in such a manner as to go through the main body 21 in the thickness direction and open in the protruding direction. The main body 21 is separated by the insert seat 23 into a lower jaw portion 24 into which the spanner screws 22A, 22B including the raised portion 21B are inserted and an upper jaw portion 25 which connects with the lower jaw portion 24 on the opposite side of the protruding direction and which is arranged opposite to the lower jaw portion 24 behind the insert seat 23.

The upper jaw portion 25 is formed in the shape of a recessed curved surface so that a surface thereof facing a protruding direction protrudes gradually in the protruding direction as the surface moves to the lower jaw portion 24. The end thereof is positioned internally from the outer diameter of a cylinder formed by the shank portion 11 in a radial direction with respect to the center axis O. On the other hand, a surface facing the protruding direction of the lower jaw portion 24 is formed so as to give approximately a raised circular-arc surface centering around the center axis O. Further, the raised circular arc is made greater in radius than the cylinder formed by the shank portion 11, thereby protruding in the protruding direction. It is noted that the thickness of a part at which these upper and lower jaw portions 24, 25 protrude in the direction of the center axis O is smaller than the length of a cutting edge 31 of a cutting insert 30 to be described later.

Further, a counterbored portion 25A having a bottom surface formed in a circular form together with the bottom surface of the counterbored portion 15B is formed on an upper surface of the upper jaw portion 25 in an attachment state where the head member 20 is attached to the head portion of the holder 10. The bottom surface of the counterbored portion 25A includes a step so as to protrude markedly from the bottom surface of the counterbored portion 15B. Still further, on one of the side surfaces closely in contact with the leading end surface of the holder 10 at the upper jaw portion 25, there is formed a groove 25B having a U-shaped cross section which is recessed from the one of the side surfaces to extend to the protruding direction and which is opened on a base end of the recessed curved surface facing to the protruding direction of the upper jaw portion 25.

The insert seat 23 formed between the upper and lower jaw portions 24, 25 is formed in such a manner that the mutually opposing upper and lower surfaces of the lower jaw portion 24 and the upper jaw portion 25 are provided with the respective cross sections formed in a reverse V shape, when viewed in the protruding direction. A contact surface facing the protruding direction is formed between the upper and lower surfaces behind the insert seat 23 on the opposite side of the protruding direction. Further, a slit 23A narrower in width than an interval of the insert seat 23 is formed toward the opposite side of the protruding direction from the contact surface in such a manner that a connecting part 26 of the upper and lower jaw portions 24, 25 remains without arriving at a side surface facing the opposite side of the protruded direction of the main body 21.

Figure 5:
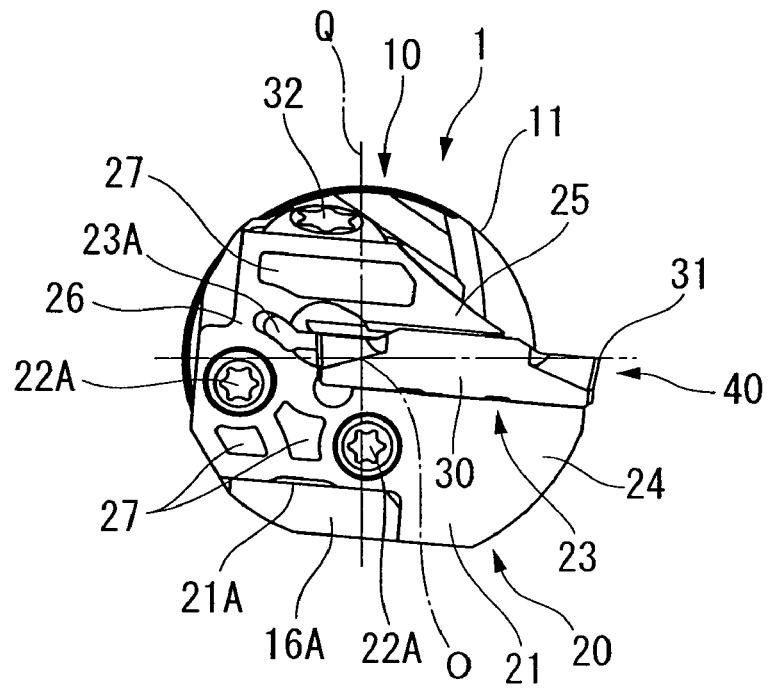
FIG. 5 is a view of the embodiment shown in FIG. 1 when viewed from the leading end in a direction of the center axis O.
Figure 6:
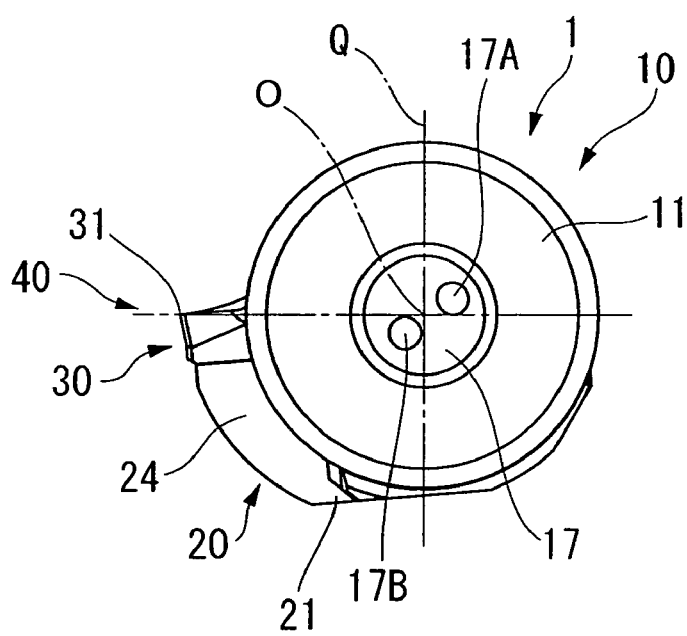
FIG. 6 is a view of the embodiment shown in FIG. 1 when viewed from the rear end in the direction of the center axis O.

In this instance, as shown in FIG. 5, while being bent at the upper jaw portion 25 toward the opposite side of the protruding direction, the slit 23A is formed so as to extend in a circular-arc shape coaxial with a through hole on the main body 21 into which one of the spanner screws 22A is inserted on the opposite side of the protruding direction. It is desirable that a center angle of the circular arc made by the slit 23A is ranged from 20° to 50°. Further, the connecting part 26 remaining between the slit 23A and the side surface facing the opposite side of the protruding direction of the main body 21 is gradually increased in thickness (the thickness along a direction formed by the circular arch made by the slit 23A) as the connecting part 26 moves to the rear end of the holder 10 in the direction of the center axis O.

Further, there are formed in the main body 21 of the head member 20 a plurality of recesses 27 which are recessed from the other side surface without going through the main body 21 of the head member 20 to have an inner wall surface continuing circumferentially and a bottom surface continuing to the inner wall surface over the entire circumference on the other side surface facing the leading end in a state of being attached to the holder 10, or opposite one of the side surfaces. These recesses 27 may be formed on one of the side surfaces closely in contact with the leading end surface of the holder 10. However, where the recesses 27 are formed on both of two side surfaces, it is desirable that the recesses 27 are formed in a shape mutually different when viewed from a direction opposite to each of the side surfaces. Further, the plurality of recesses 27 may be different in depth when viewed from each of the side surfaces.

The main body 21 of the head member 20 having these recesses 27 can be produced by an MIM method (Metal Injection Molding) in which, for example, a material prepared by mixing a raw material of steel fine powders and a binder such as plastic which provides fluidity is subjected to ejection molding inside a divided mold at which the shape of the head member 20 is reversed and the binder is thereafter removed thermally to sinter the raw material of fine powders. Specifically, where the main body 21 is produced according to the MIM method, it is desirable that a volume of the recesses 27 is ranged from 2% to 15% on the basis of a volume of the main body 21 free of the recesses 27. It is also desirable that after sintering, the top surface of the main body 21 is subjected to shot peening.

A cutting insert 30 attached to the insert seat 23 of the above-described head member 20 is formed with a hard material such as a cemented carbide in the shape of a rectangular rod, with the outer shape being an approximately rectangular cross section, and arranged between the upper and lower jaw portions 24, 25 of the insert seat 23. Both of the lower surface and an upper central part of the cutting insert 30 are formed so as to give a V-groove cross section, while the upper and lower jaw portions 24, 25 of the insert seat 23 are raised so as to give a reverse V-cross section. Then, the lower surface of the cutting insert 30 can make contact with the lower jaw portion 24 and the upper central part of the cutting insert 30 can make contact with the upper jaw portion 25 in such a manner that the respective V-shaped bisectors are allowed to be in alignment with each other. Further, rake surfaces are formed at the respective positions retracted markedly from the central part on both ends of the upper surface, and a cutting edge 31 used in groove-forming is formed at both end edges of the rake surfaces.

The above-described cutting insert 30 is inserted into the insert seat 23 along a radial direction perpendicular to the center axis O from the protruding direction, with one of the cutting edges 31 directed toward the protruding direction, in such a manner that, as described above, the lower surface and the upper central part of the cutting insert 30 are respectively allowed to be in contact with the upper and lower surfaces of the upper and lower jaw portions 24, 25 of the insert seat 23 in a sliding manner. Further, the end surface of the cutting insert 30 continuing to the other of cutting edges 31 is brought in contact with the contact surface of the insert seat 23 beyond the center axis O, by which the end surface is positioned in the radial direction with respect to the center axis O and seated on the insert seat 23.

Then, a head-equipped clamping screw 32 is screwed into a screw hole of the counterbored portion 15B, pressing the counterbored portion 25A of the upper jaw portion 25 by using the head, by which the upper jaw portion 25 undergoes elastic deformation so as to sag to the lower jaw portion 24, with a connecting part 26 used as a supporting point. The cutting insert 30 is fixed on the insert seat 23 so as to be clamped between the upper jaw portion 25 and the lower jaw portion 24. Further, one of the cutting edges 31 of the cutting insert 30 pointed at the protruding direction in a clamped state is arranged in parallel with the center axis O of the holder 10. Then, in a such a manner that the distance from the center axis O is slightly greater than the radius of a raised circular arc formed by a surface of the lower jaw portion 24 facing in the protruding direction, the cutting edge 31 in the cutting tool outstandingly protrudes to the radially outer circumference in the radial direction from the center axis O. Accordingly, the above-described cutting edge portion 40 is formed.

Figure 2:
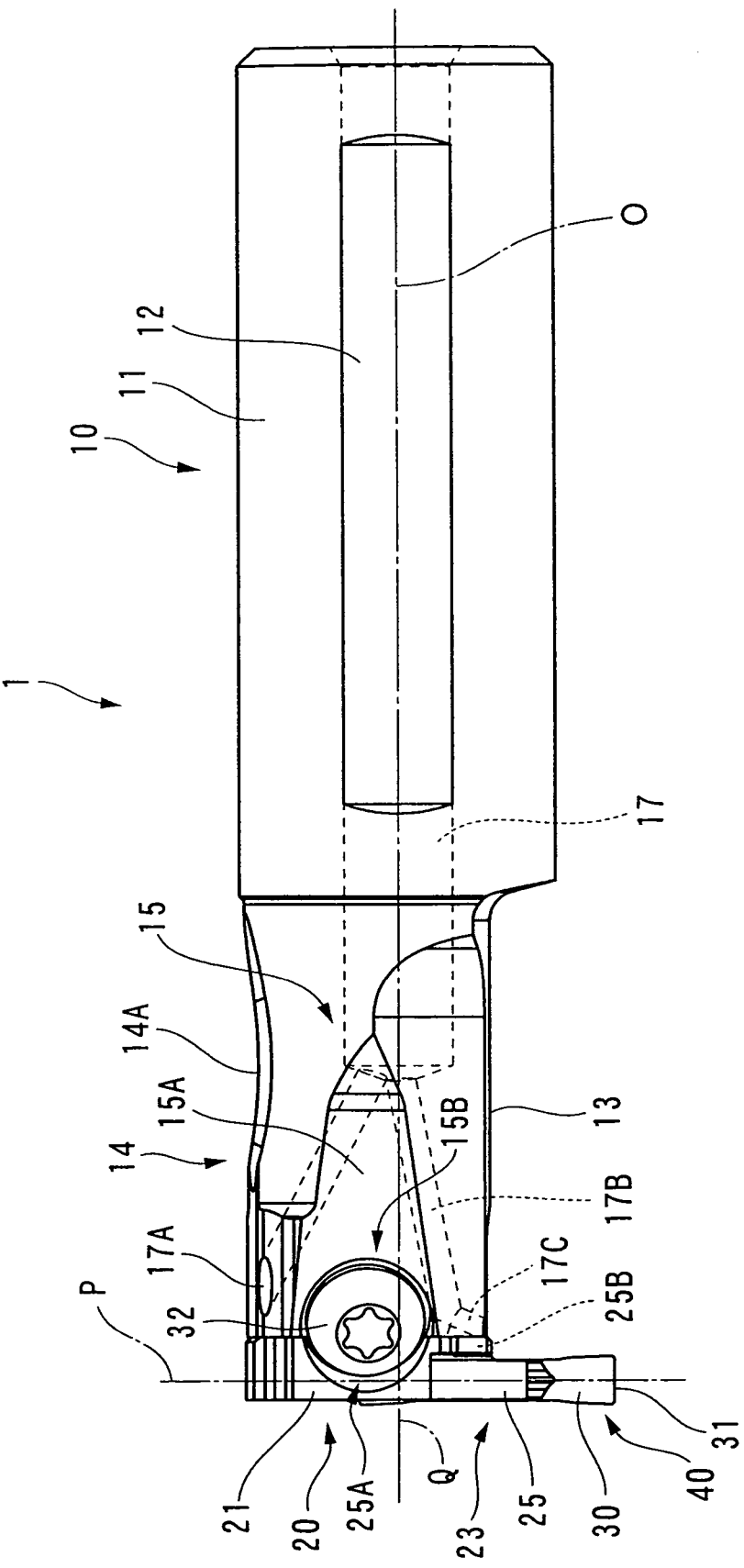
FIG. 2 is a plan view of the embodiment shown in FIG. 1.
Figure 3:
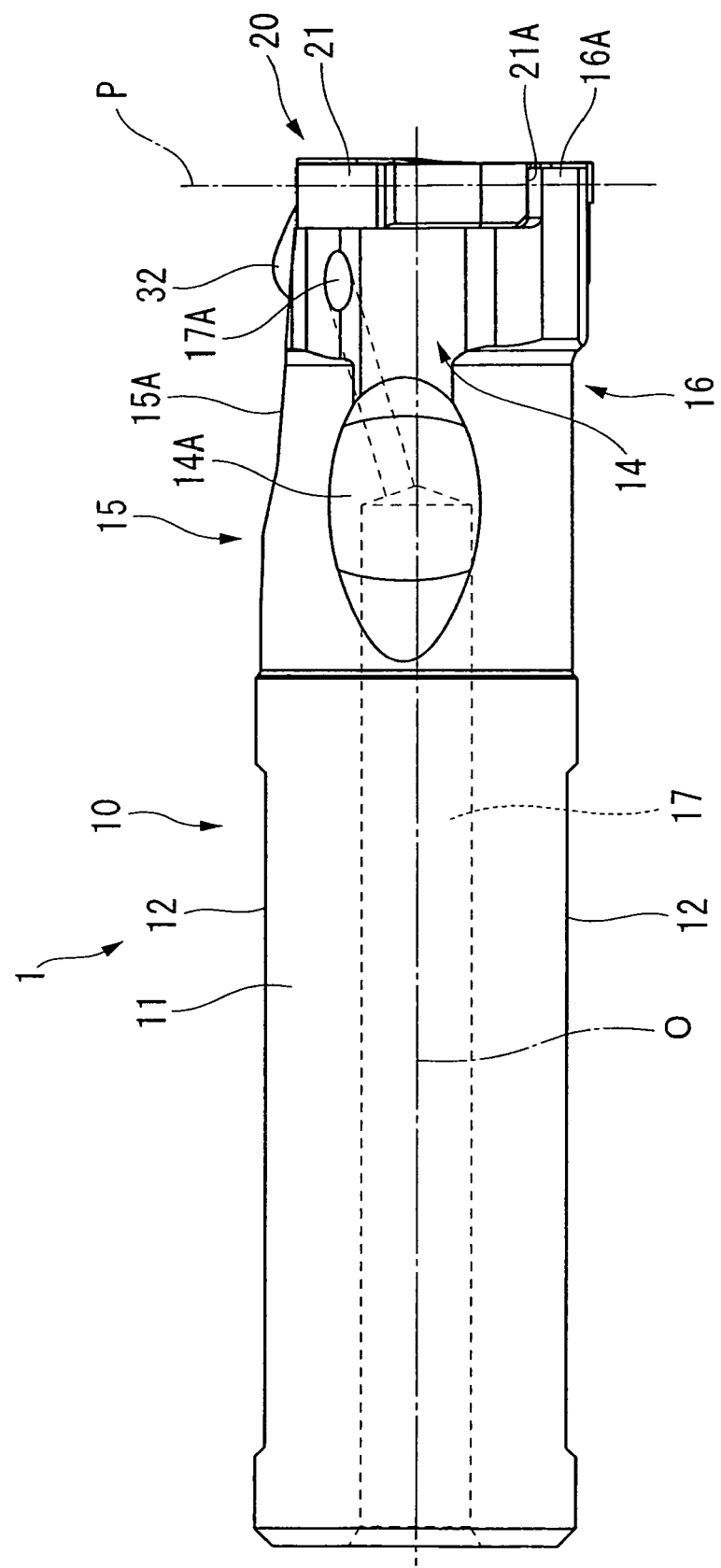
FIG. 3 is a side plan view of the embodiment shown in FIG. 1, when viewed from the other side surface 14 (the other coolant hole 17B is not illustrated).
Figure 4:
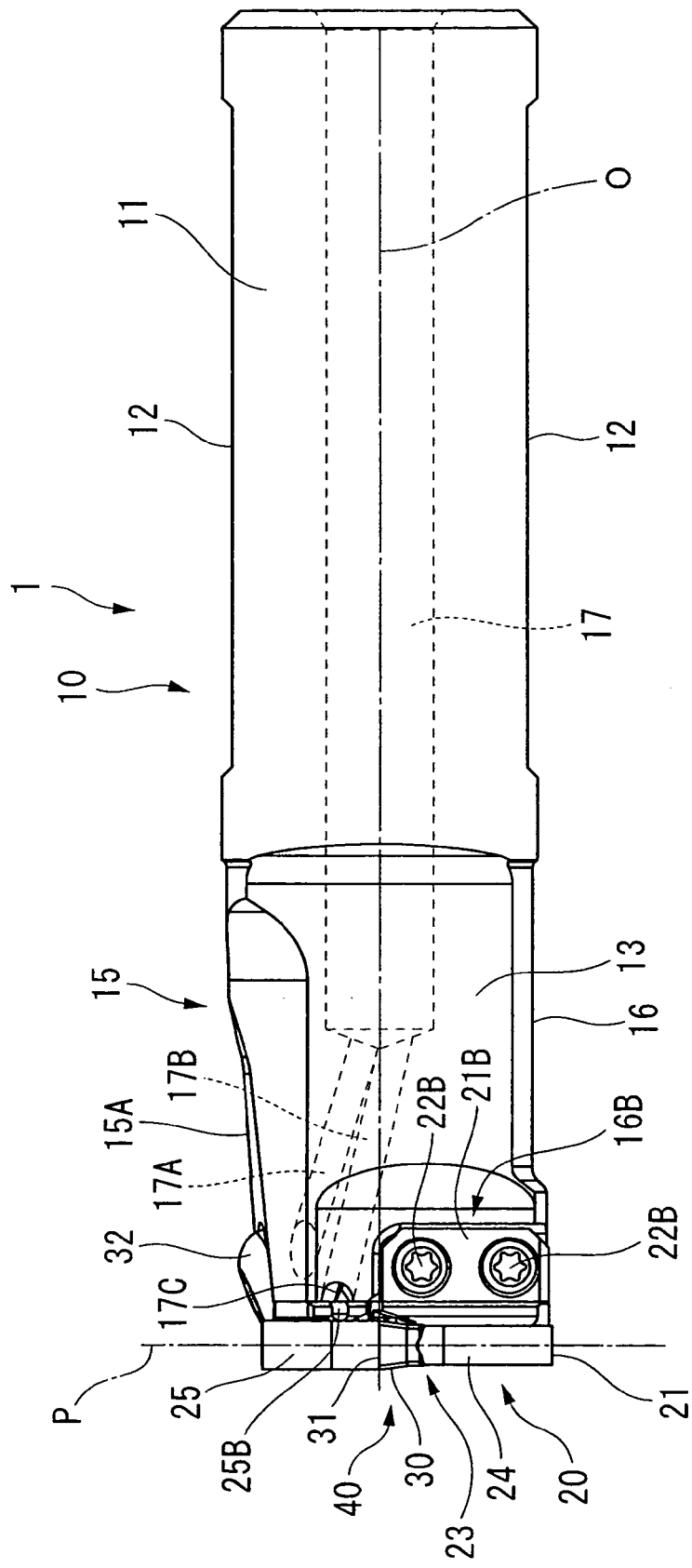
FIG. 4 is a side plan view of the embodiment shown in FIG. 1, when viewed from a side surface 13.

Then, a coolant hole 17 for supplying a coolant (cutting lubricant) fed from a working machine is further formed on the holder 10 of the cutting tool main body 1 so as to face the leading end from the rear end surface of the holder 10 along the center axis O. In the present embodiment, as shown in FIG. 2, the coolant hole 17 is bifurcated into two parts within the head portion of the holder 10. A coolant hole 17A, or one of the two parts, has an opening at a position apart from the cutting edge portion 40 on the circumferential surface at the head portion of the holder 10, and the opening is provided in a direction different from the protruding direction in the radial direction with respect to the center axis O. A coolant C is flushed out from the opening of the coolant hole 17A to an axially orthogonal plane P which is orthogonal to the center axis O and also along the protruding direction of the cutting edge portion 40.

In this instance, the bifurcated coolant hole 17A in the present embodiment is smaller in diameter than the coolant hole 17 extending along the center axis O from the rear end surface of the holder 10 and opened, as shown in FIG. 2, on the opposite side of the cutting edge portion 40 in a circumferential direction of the cutting tool main body 1 behind an axially parallel plane Q orthogonal to the protruding direction along the center axis O. In other words, the circumferential surface of the head portion of the cutting tool main body 1 is divided into an approximately semi-cylindrical region having the cutting edge portion 40 at the center and a remaining approximately semi-cylindrical region by the border of the axially parallel plane Q, when the head portion of the cutting tool main body 1 is viewed from the direction of the center axis O. In this instance, the opening of the coolant hole exists at the remaining semi-cylindrical region devoid of the cutting edge portion 40. In the present embodiment, the coolant hole 17A is opened between the other side surface 14 and the upper surface 15 at the head portion of the holder 10. It is noted that the coolant hole 17A is inclined so as to come close to the outer circumference as close to the leading end of the cutting tool main body from the bottom of the coolant hole 17, thereby extending in a straight line. In addition, the coolant C is flushed out from the coolant hole 17A in an oblique direction in relation to the axially orthogonal plane P.

The coolant hole 17A is bifurcated from the coolant hole 17 along the center axis O and opened straight in a straight line on the outer circumference surface of the cutting tool main body 1, by which the coolant hole 17A is opened in such a manner that the direction in the radial direction with respect to the center axis O is opposite to the protruding direction of the cutting edge portion 40 in relation to the axially parallel plane Q. In other words, when the head portion of the cutting tool main body 1 is viewed from the direction of the center axis O, the opening of the coolant hole 17A faces a direction opposite to the leading end of the cutting edge portion 40. In the present embodiment, for example, the coolant hole 17A is opened in the radial direction with respect to the center axis O at a position of approximately 135° (a position at approximately 45° in a counter-clockwise direction from the axially parallel plane Q) toward a direction (the counter-clockwise direction in FIG. 5) at which the rake surface of the cutting edge 31 faces the center axis O from the cutting edge 31.

In the present embodiment, as described above, the coolant hole 17 extending from the rear end surface of the holder 10 is bifurcated into two parts at the head portion of the holder 10. The other of the thus bifurcated parts, the coolant hole 17B, extends to the opposite direction of the coolant hole 17A (the protruding direction of the cutting edge portion 40) behind the axially parallel plane Q and is opened on the leading end surface of the holder 10 at a position communicating with the groove 25B formed on one of the side surfaces of the main body 21 of the head member 20 closely in contact with the leading end surface of the holder 10.

Further, a groove 17C extending in the protruding direction on the leading end surface of the holder 10 is formed from the thus opened coolant hole 17B opened on the leading end surface of the holder 10 so as to run along the groove 25B, and opened on the side surface 13 facing the protruding direction of the head portion of the holder 10. It is noted that the groove 17C is formed so as to have a semi-circular cross section in which, for example, in an opening on the side surface 13, the width of an opening on the leading end surface of the holder 10 is greater than the groove 25B, and the depth of the groove is gradually shallower as the groove 17C as close to the opening of the side surface 13, in other words, toward the protruding direction.

In one embodiment of the cutting method of the present invention using the above-described detachable insert-type cutting tool, as indicated by the arrow line in FIG. 7A, the head portion of the holder 10 of the cutting tool main body 1 is first inserted into a hole H formed in advance on a workpiece W rotating around a rotating axis L. More specifically, as indicated by the arrow line in FIG. 7B, the head portion is inserted into the hole H at a position at which a groove is formed by the cutting edge portion 40 in such a manner that the center axis O is parallel to the rotating axis L and also the head portion including the cutting edge portion 40 which has protruded will not interfere with the hole H.

Figure 8B:
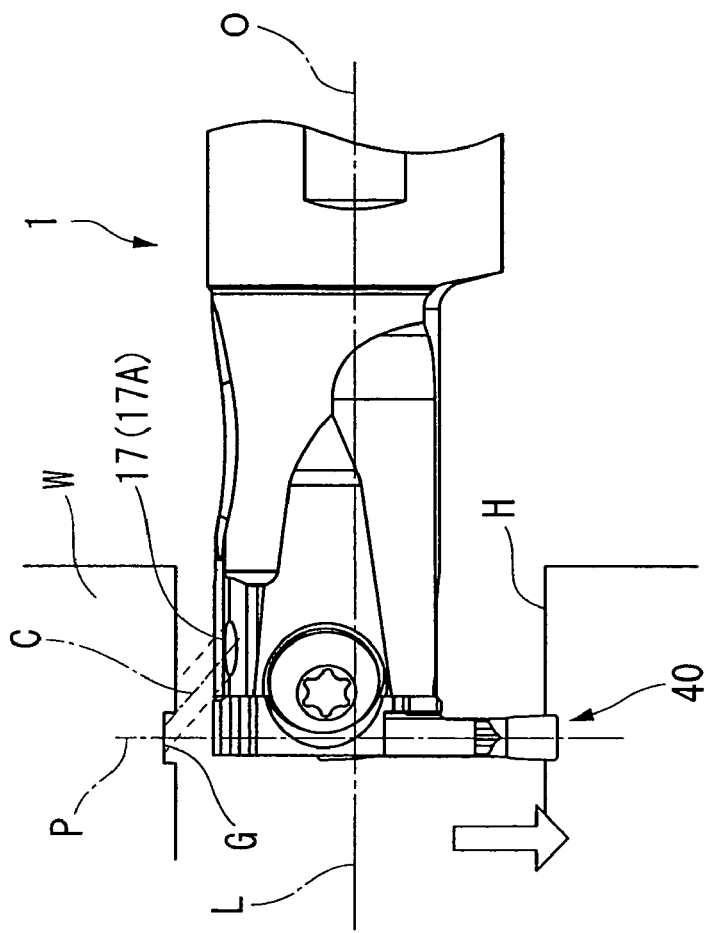
FIG. 8B is a side plan view of the cutting tool main body 1.
Figure 8A:
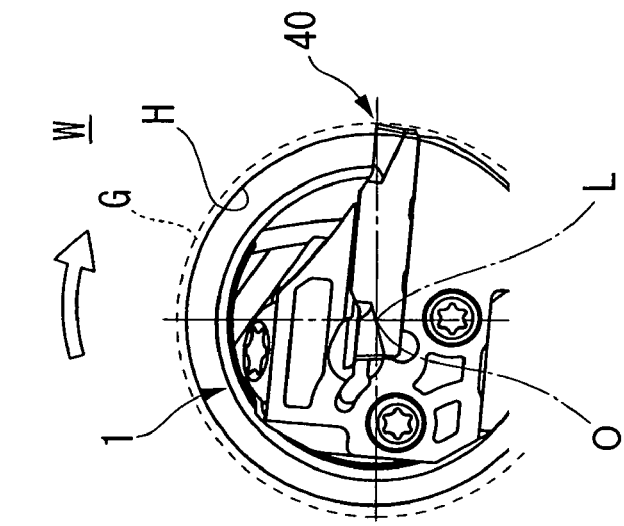
FIG. 8A is a view used to explain one embodiment of the cutting method of the present invention where the inner surface of the hole is cut according to the embodiment shown in FIG. 1.

Then, as indicated by the arrow line in FIG. 8B, the cutting tool main body 1 is carried perpendicularly with respect to the center axis O in the protruding direction of the cutting edge portion 40, by which the cutting edge 31 is allowed to cut into an inner circumferential surface of the hole H. Thus, groove-forming is given to the inner circumferential surface of the hole H so as to run along the axially orthogonal plane P, thereby a groove G is formed annularly so as to make one round continuously at the center of the rotating axis L. As a result, the coolant C is flushed out via the coolant hole 17 from openings of the coolant holes 17A, 17B. The coolant C is flushed out in a direction different from the protruding direction or in the radial direction with respect to the center axis O in relation to the axially orthogonal plane P from the coolant hole 17B apart from a position at which the cutting edge portion 40 protrudes in the circumferential direction of the cutting tool main body 1. The thus flushed coolant C is supplied into the groove G along the axially orthogonal plane P.

Figure 9B:
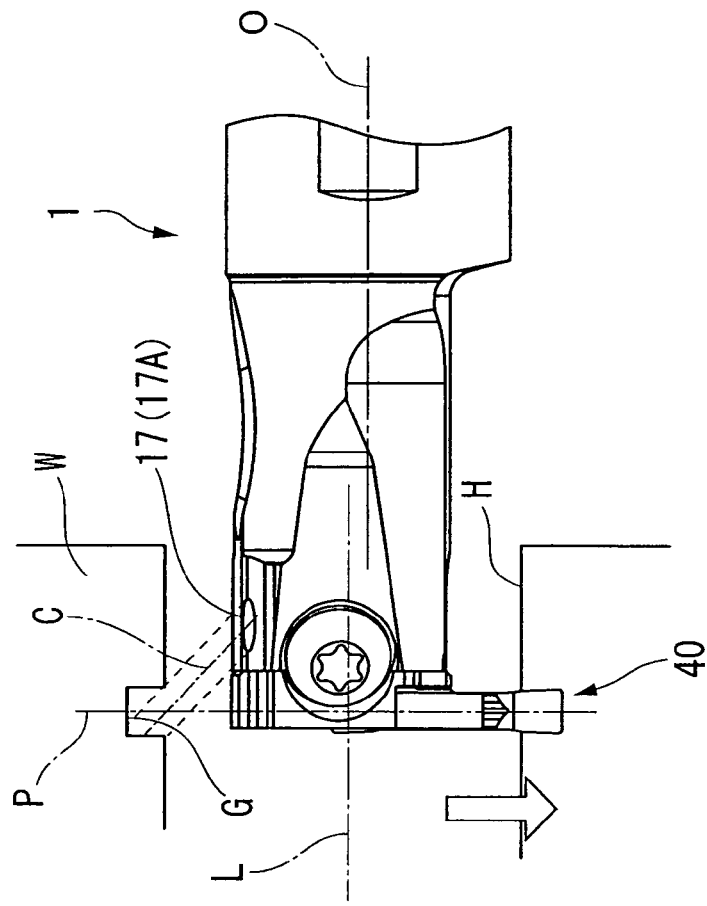
FIG. 9B is a side plan view of the cutting tool main body 1.
Figure 9A:
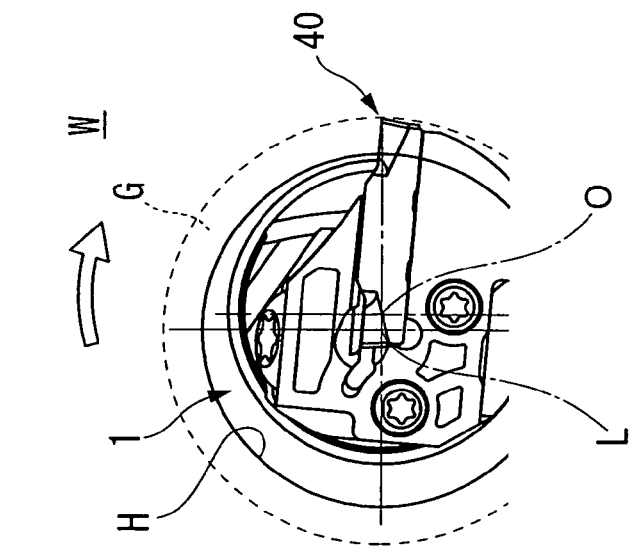
FIG. 9A is a view used to explain one embodiment of the cutting method of the present invention where the inner surface of the hole is cut according to the embodiment shown in FIG. 1.
Figure 10:
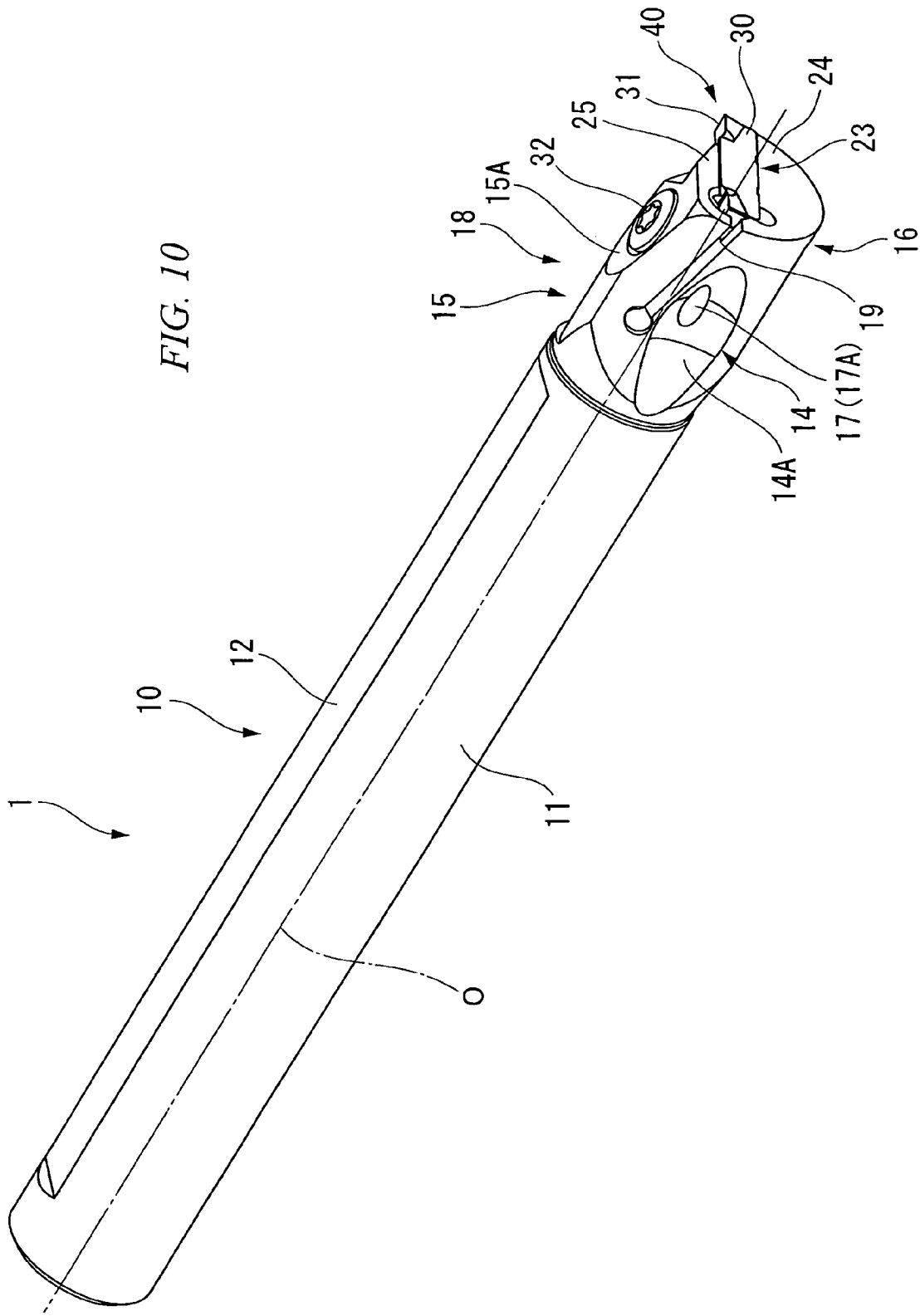
FIG. 10 is a perspective view showing a second embodiment of the cutting tool of the present invention.
Figure 11:
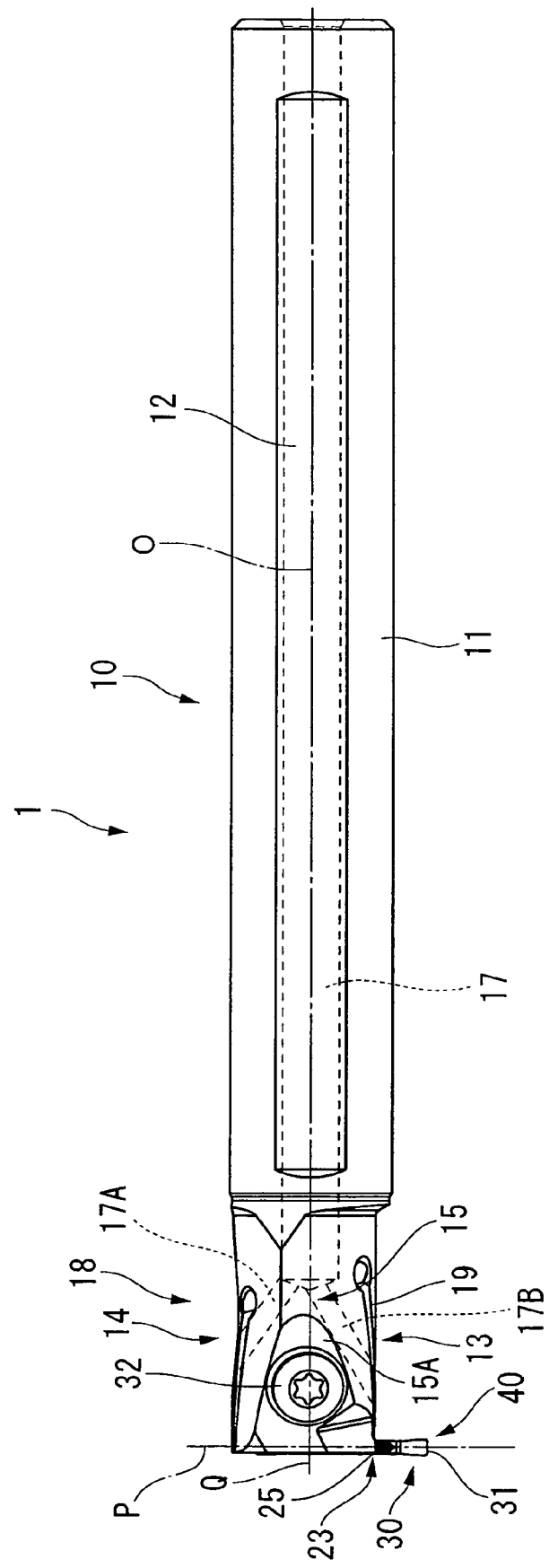
FIG. 11 is a plan view of the embodiment shown in FIG. 10.
Figure 12:
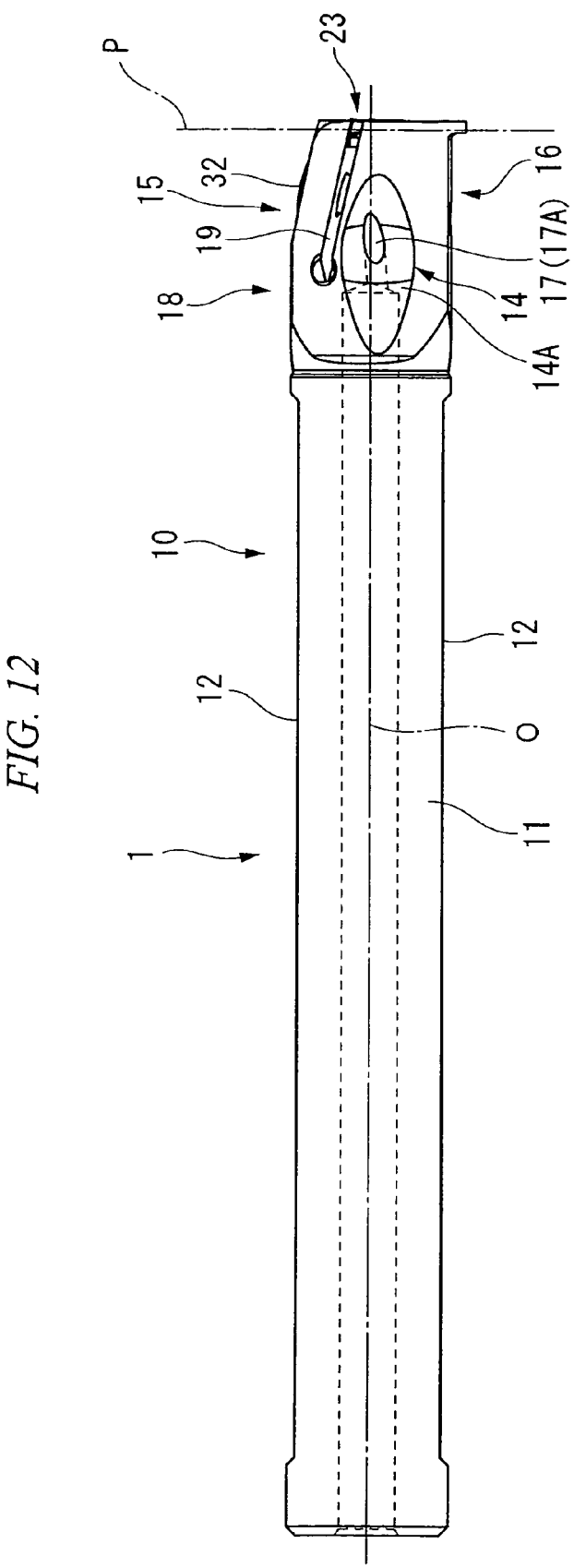
FIG. 12 is a side plan view of the embodiment shown in FIG. 10 viewed from the other side surface 14 (the other coolant hole 17B is not illustrated).
Figure 13:
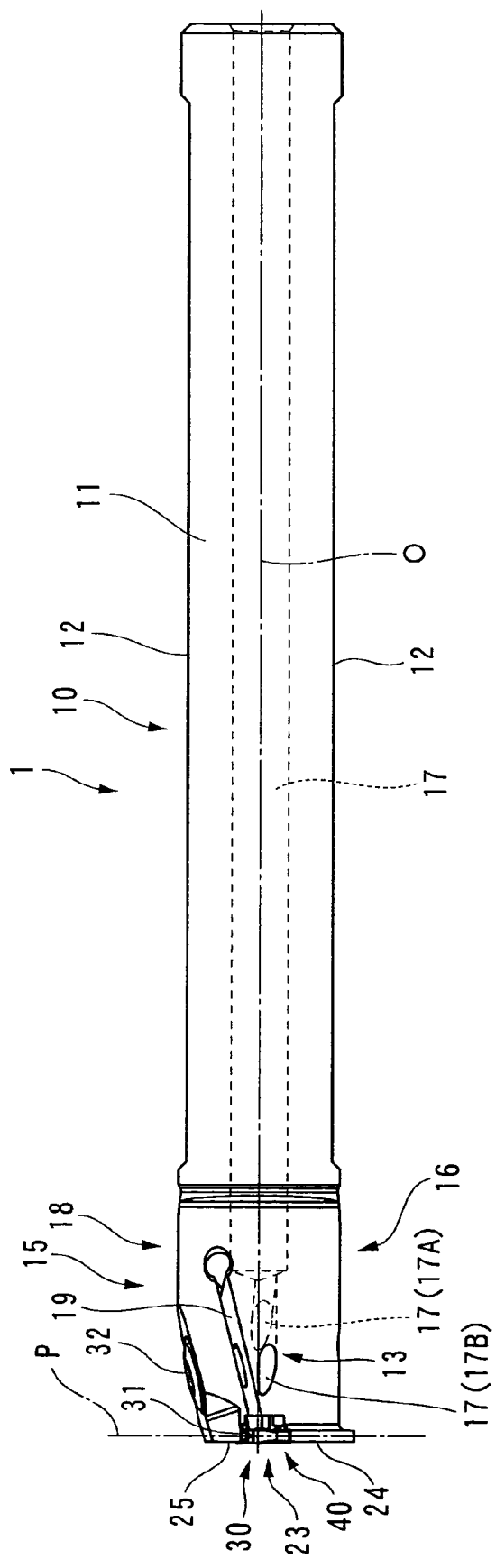
FIG. 13 is a side plan view of the embodiment shown in FIG. 10 viewed from the side surface 13.
Figure 14:
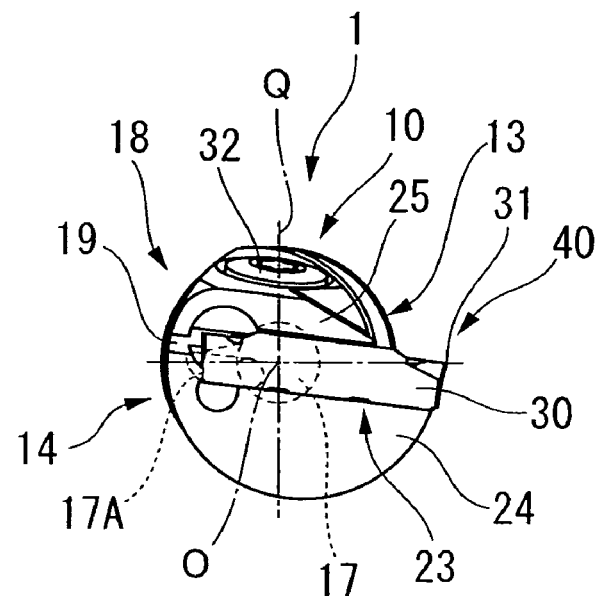
FIG. 14 is a view a leading end of the cutting tool main body of the embodiment shown in FIG. 10 (the other coolant hole 17B is not illustrated).
Figure 15:
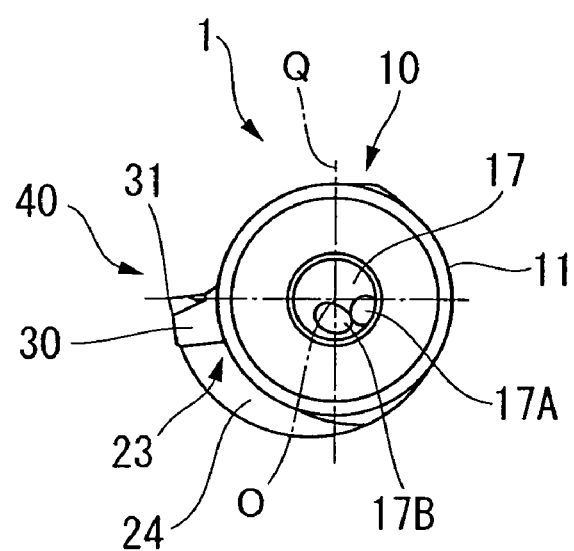
FIG. 15 is a view of the embodiment shown in FIG. 10 viewed from the rear end in the direction of the center axis O.

Then, the coolant C supplied into the groove G is retained inside the groove G by a centrifugal force resulting from the rotation of the workpiece W and arrives a cut site by the cutting edge 31 of the cutting edge portion 40 in association with the rotation of the workpiece W. Therefore, the above-constituted cutting tool and the cutting method using this tool are able to effectively cool and lubricate the cutting edge 31 and the workpiece W at the cut site. Further, the coolant C is flushed out toward the axially orthogonal plane P, as described above. Therefore, for example, even in the present embodiment where the coolant hole 17A is formed so as to flush out the coolant C in an oblique direction in relation to the axially orthogonal plane P, the coolant C can be supplied to the groove G until the groove G is formed to some depth, as shown in FIG. 9A and FIG. 9B.

Therefore, even where the coolant hole 17B is provided apart from a position at which the cutting edge portion 40 protrudes or in a direction different from the protruding direction, it is possible to reliably supply the coolant C to a cut site. Thus, for example, unlike a case where a coolant hole is formed so as to be opened on a surface facing the protruding direction of the upper and lower jaw portions 24, 25 at which the cutting edge portion 40 protrudes, there is no chance that the coolant hole is dimensionally restricted by the thickness of the upper and lower jaw portions 24, 25. Further, there is no chance that the cutting edge portion 40 is deteriorated in rigidity or the cutting insert 30 is decreased in seating stability by provision of the above-described coolant hole.

As a result, it is possible to secure a larger opening area of the coolant hole 17A and also to supply a sufficient quantity of the coolant C to a cut site. Further, the coolant C is retained inside the groove G and reliably supplied to the cut site without scattering by centrifugal force. Still further, the coolant C is supplied to a position different from the cutting edge portion 40 and arrives at the cut site by the rotation of a workpiece W before making one round from a supply position. In addition, the cooling effect of the coolant C is not affected. Therefore, the above-constituted cutting tool and the cutting method are able to reduce cutting resistance by lubrication and also extend the life of the cutting edge portion 40 by cooling. Thus, it is possible to provide stable and smooth cutting.

Further, in the present embodiment, the coolant hole 17A is opened on the opposite side of the cutting edge portion 40 of the cutting tool main body 1 behind the axially parallel plane Q. Therefore, when the cutting edge portion 40 is allowed to cut into the inner circumferential surface of the hole H in the protruding direction, a clearance is gradually increased according to a cut amount on the opposite side of the cutting edge portion 40 behind the axially parallel plane Q, as shown in FIG. 7A to FIG. 9B. The coolant C is to be flushed out through the clearance to the groove G formed on the inner circumferential surface of the hole H and retained reliably, thereby the coolant C can be supplied in a more sufficient quantity to the cut site.

In addition to the fact that the above-described coolant hole 17A is provided on the opposite side of the cutting edge portion 40 behind the axially parallel plane Q, in the present embodiment, the direction at which the coolant hole 17A opens in the radial direction is also opposite to the protruding direction of the cutting edge portion 40 in relation to the axially parallel plane Q. Thereby, the coolant C is supplied to the inner circumferential surface of the hole H on the opposite side of the cutting edge portion 40 behind the axially parallel plane Q. As a result, even when the coolant C is supplied from the cutting edge portion 40 to a position of 90° in a rotating direction of a workpiece W around the center axis O, it is possible to reduce the distance from this position to a cut site is approximately ¾ of a circumference of the hole H.

Therefore, unlike Japanese Published Unexamined Patent Application No. H07-237006 in which if a coolant does not make one round, the coolant will not arrive at a cut site, the present invention is able to reliably prevent the coolant C from being scattered or heated. However, where the coolant hole 17A is provided on the opposite side of the cutting edge portion 40 behind the axially parallel plane Q but open so as to face the same side as the protruding direction of the cutting edge portion 40 faces in relation to the axially parallel plane Q, there are fears that the coolant C may be supplied from the cutting edge portion 40 to a position of less than 90° in the rotating direction of a workpiece W.

On the other hand, where the coolant hole 17A of the present invention is open in the direction of the center axis O of the cutting tool main body 1, the coolant hole 17A is provided so as to flush out the coolant C in an oblique direction in relation to the axially orthogonal plane P. Consequently, since the coolant hole 17A is not provided on the axially orthogonal plane P at which the cutting edge portion 40 of the cutting tool main body 1 is positioned, it is possible to improve the rigidity of the cutting tool main body 1 at a position of the cutting edge portion 40 on which cutting loads act. It is also possible to prevent the machining accuracy from being deteriorated due to vibrations generated on the cutting tool main body 1 at the time of cutting.

Further, the cutting edge portion 40 of the present invention is a groove-forming cutting edge portion at which the groove-forming cutting insert 30 is attached to the insert seat 23. The cutting edge portion 40 is cut in the radial direction with respect to the rotating axis L, and thereby an annular groove around the rotating axis L is formed on the inner circumferential surface of the hole H. In particular, in the present embodiment, the cutting edge 31 of the cutting insert 30 is parallel to the center axis O and a groove G having a U-shaped cross section is formed on the inner circumferential surface of the hole H. Therefore, the coolant C supplied to the groove G is less likely to flow from the groove G in a direction of the rotating axis L or in a circumferential direction of the hole H, thus making it possible to supply the coolant C to a cut site more effectively.

Further, in the present invention, in addition to the above-described coolant hole 17A, the coolant hole 17B or the other part bifurcated from the coolant hole 17 is provided so as to be open at the base end of the cutting edge portion 40 which has protruded. Since the coolant C is flushed out from the coolant hole 17B as well, it is possible to attain the further improved lubrication and cooling effects. Furthermore, the coolant hole 17B communicates with a groove 25B formed on the main body 21 of the head member 20 on which the cutting insert 30 is mounted, and is supplied directly to a cut site by the cutting edge 31 so as to be guided into the groove 25B. Thereby, it is possible to lubricate and cool the cut site more effectively.

Further, in the present embodiment, the groove 25B communicating with the coolant hole 17B which guides the coolant C is formed at the head member 20 attached to the leading end of the holder 10. Where the main body 21 of the head member 20 is formed according to the MIM method described previously, only a projected streak for forming the groove 25B may be formed in a divided mold for ejection molding. The coolant hole 17B can be formed easily, for example, when compared with a case of the head member 20 integrally formed with the holder 10 in which, after the coolant hole 17B bifurcated from the coolant hole 17 is formed in a straight line using a drill or the like, a hole bent further from the coolant hole 17B is formed to seal an opening of the coolant hole 17B other than the thus bent hole.

In the present embodiment, as described above, the coolant hole 17 is bifurcated into two parts to form the coolant hole 17B which is the other hole. However, where the coolant hole 17A is able to provide sufficient cooling and lubrication, the other hole, that is, the coolant hole 17B is not required. Further, the present invention shall not be limited to only the above-described groove-forming but may be applicable to a case where, for example, after the cutting edge 31 is allowed to cut the workpiece in a relatively small cutting depth, the cutting tool main body 1 is moved in a direction of the rotating axis L to cut an inner circumferential surface of the hole H to a predetermined inner diameter.

Still further, in place of forming the coolant hole 17A so as to flush out the coolant C in an oblique direction in relation to the axially orthogonal plane P as described above, in order to flush out the coolant C along the axially orthogonal plane P, the coolant hole 17A may be formed on the outer circumference surface of the cutting tool main body 1 on the axially orthogonal plane P so as to extend and open along the axially orthogonal plane P. In this instance, the coolant C can be supplied more reliably to a groove G formed by the cutting edge portion 40, where the cutting tool main body 1 is changed in position in a radial direction with respect to the rotating axis L by cutting of the cutting edge 31 or with respect to a hole H whose inner diameter is changed depending on various operations.

In particular, in the cutting tool main body 1 in which the head member 20 is separated from the holder 10 as described in the present embodiment, in order to form the coolant hole 17A opened on the axially orthogonal plane P, the coolant hole 17A is formed so as to be opened on the leading end surface of the holder 10, as with the coolant hole 17B. Then, a groove communicating with the coolant hole 17A is open away from a position at which the cutting edge portion 40 protrudes in a circumferential direction of the cutting tool main body 1 so as to face a direction different from the protruding direction of the cutting edge portion 40. In addition, the groove is formed along the axially orthogonal plane P so that the coolant C can be flushed out to the axially orthogonal plane P.

Then, FIG. 10 to FIG. 15 show a second embodiment of the cutting tool in the present invention, and elements common to the first embodiment shown in FIG. 1 to FIG. 6 will be given the same reference numerals and a description thereof will be omitted. In other words, in the cutting tool of the present embodiment, the holder 10 of the cutting tool main body 1 is integrally formed from a shank portion 11 to a head portion 18. Thus, there is not provided the head member 20 which is a separate body in the first embodiment. A cutting insert 30 is detachably attached to an insert seat 23 formed directly at the leading end of the head portion 18 of the holder 10, thereby constituting a cutting edge portion 40 protruding in the radial direction with respect to the center axis O.

In this instance, a slit 19 is formed at the head portion 18 so as to obliquely extend as close to an upper surface 15 in a direction from the leading end surface of the head portion 18 to the rear end thereof. The slit 19 faces opposite to the protruding direction of the cutting insert 30. The cutting insert 30 is inserted into the insert seat 23 formed on an opening of the slit 19 on the leading end surface of the head portion 18, and a clamping screw 32 which is inserted from an inclination surface 15A of the upper surface 15 so as to go through the slit 19 perpendicularly is screwed into the head portion 18, by which the cutting insert 30 is clamped and fixed.

Then, in the present embodiment, the coolant hole 17A is provided so as to be open inside a hollow 14A formed on the other side surface 14 facing the opposite side of the protruding direction of the head portion 18. An opening of the coolant hole 17A faces a direction different from the protruding direction of the cutting edge portion 40 in the radial direction with respect to the center axis O in such a manner that the coolant C is flushed out to the axially orthogonal plane P apart from a position at which the cutting edge portion 40 protrudes in a circumferential direction of the cutting tool main body 1. It is noted that the coolant hole 17A of the present embodiment is formed so as to be open at a position approximately opposite to the cutting edge portion 40 behind the center axis O in the circumferential direction and at a direction also approximately opposite to the protruding direction behind the center axis O in the radial direction.

The same effects as those of the first embodiment can also be obtained in the above-described cutting tool of the second embodiment. Further, the head member 20 of the first embodiment is not required and the spanner screws 22A, 22B for fixing the head member 20 are not required either. It is, thereby, possible to decrease the number of components and reduce the cost. In the first and second embodiments, the cutting edge portion 40 is constituted by mounting the cutting insert 30. However, it is matter of course that the present invention can also be applicable, for example, to a brazed tool in which a hard cutting edge member is bonded by brazing or the like and to a solid cutting tool in which the cutting edge portion 40 is integrally formed on the cutting tool main body 1.

Descriptions have so far been given for preferred embodiments of the present invention, to which the present invention shall not be, however, restricted. The constitution of the present invention may be added to, and the invention may be subjected to omissions, replacements and other modifications within a scope not departing from the spirit of the present invention. The present invention is not restricted to the above description and is only restricted by the scope of the attached claims.

What is claimed is:

1. A cutting tool for groove-forming an inner circumferential surface of a hole of a workpiece, comprising:
   a cutting tool main body extending in the shape of a shaft;
   a cutting edge portion which is provided on a head portion of the cutting tool main body so as to radially-outwardly protrude with respect to the center axis of the cutting tool main body; and
   a coolant hole which is provided at the cutting tool main body so as to have a first opening at a position apart from the cutting edge portion on a circumferential surface of the head portion of the cutting tool main body, thereby flushing out a coolant from the opening to an axially orthogonal plane orthogonal to the center axis and also in a protruding direction at which the cutting edge portion protrudes; wherein
   the cutting edge portion is a groove-forming cutting edge portion for forming an annular groove on an inner circumferential surface of a hole formed on a workpiece being rotated around a rotating axis,
   the cutting edge portion having a rectangular-rod shaped cutting insert attached to the head portion of the cutting tool main body in a radial direction perpendicular to the center axis of the cutting tool main body, and cutting edges formed on the both ends of the cutting insert so as to be parallel to the center axis, and
   the first opening of the coolant hole faces a direction different from the protruding direction of the cutting edge portion in a radial direction with respect to the center axis, and through which the coolant is supplied to the annular groove.

2. The cutting tool for groove-forming an inner circumferential surface of a hole of a workpiece according to claim 1, wherein the first opening of the coolant hole is positioned on the opposite side of the cutting edge portion in a circumferential direction of the cutting tool main body behind an axially parallel plane orthogonal to the protruding direction of the cutting edge portion along the center axis.

3. The cutting tool for groove-forming an inner circumferential surface of a hole of a workpiece according to claim 2, wherein the first opening of the coolant hole is formed so as to face away from the protruding direction of the cutting edge portion and in the radial direction with respect to the center axis in relation to the axially parallel plane orthogonal to the protruding direction of the cutting edge portion along the center axis.

4. The cutting tool for groove-forming an inner circumferential surface of a hole of a workpiece according to claim 1, wherein the first opening of the coolant hole is provided so as to flush out the coolant in an oblique direction in relation to the axially orthogonal plane.

5. The cutting tool for groove-forming an inner circumferential surface of a hole of a workpiece according to claim 2, wherein the first opening of the coolant hole is provided so as to flush out the coolant in an oblique direction in relation to the axially orthogonal plane.

6. The cutting tool for groove-forming an inner circumferential surface of a hole of a workpiece according to claim 3, wherein the first opening of the coolant hole is provided so as to flush out the coolant in an oblique direction in relation to the axially orthogonal plane.

7. A method for groove-forming an inner circumferential surface of a hole comprising:
   a step in which the cutting tool according to claim 1 is inserted into the hole formed at the center of the rotating axis of the workpiece being rotated around the rotating axis;

a step in which one of the cutting edges of the cutting edge portion is allowed to cut into the inner circumferential surface of the hole in the protruding direction of the cutting edge portion, thereby forming on the inner circumferential surface of the hole; and a step in which a coolant is flushed out in the radial direction with respect to the center axis and in a direction different from the protruding direction of the cutting edge portion through the first opening of the coolant hole in relation to the axially orthogonal plane, thereby supplying the coolant to the hole annular groove.

8. The cutting tool for machining an inner surface of a hole according to claim 1, wherein the coolant hole is bifurcated into two parts within the cutting tool main body, a second opening of the bifurcated coolant hole is formed on the base end of the cutting edge portion, and the coolant is supplied to the annular groove of the workpiece through the second opening of the coolant hole.

9. The cutting tool for machining an inner surface of a hole according to claim 1, wherein an upper jaw portion and a lower jaw portion are formed on the head portion of the cutting tool main body, an insert seat is formed between the upper jaw portion and the lower jaw portion, and the cutting insert is attached to the insert seat so as to be clumped between the upper jaw portion and the lower jaw portion.

* * * * *